(12) United States Patent
Kitaoka et al.

(10) Patent No.: US 10,393,936 B2
(45) Date of Patent: Aug. 27, 2019

(54) LIGHT SOURCE DEVICE AND MANUFACTURING METHOD OF LIGHT SOURCE DEVICE

(71) Applicant: PANASONIC INTELLECTUAL PROPERTY MANAGEMENT CO., LTD., Osaka (JP)

(72) Inventors: Shinichi Kitaoka, Osaka (JP); Hiroshi Kitano, Hyogo (JP); Sachiko Azuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/704,416

(22) Filed: Sep. 14, 2017

(65) Prior Publication Data

US 2018/0081107 A1    Mar. 22, 2018

(30) Foreign Application Priority Data

Sep. 21, 2016 (JP) .................................. 2016-184847

(51) Int. Cl.
| | | |
|---|---|---|
| *D03D 15/00* | (2006.01) | |
| *F21V 7/04* | (2006.01) | |
| *G02B 6/44* | (2006.01) | |
| *G09F 13/18* | (2006.01) | |
| *F21V 8/00* | (2006.01) | |

(52) U.S. Cl.
CPC .................................. *G02B 6/0006* (2013.01)

(58) Field of Classification Search
CPC .................. G02B 6/0005–0006; G02B 6/4298
USPC .................................. 362/259, 553–554, 556
See application file for complete search history.

(56) References Cited

U.S. PATENT DOCUMENTS 7,118,290 B2 *  10/2006  Ishigami ................ G02B 6/421
                                                            385/78
2013/0182452 A1    7/2013  Takahira et al.

FOREIGN PATENT DOCUMENTS

JP          2013-149449          8/2013

* cited by examiner

*Primary Examiner* — Jason M Han
(74) *Attorney, Agent, or Firm* — Greenblum & Bernstein, P.L.C.

(57) ABSTRACT

A light source device is provided. The light source device includes: a ferrule which holds an optical fiber; a light-emitting element which emits laser light; and a casing which houses the ferrule and the light-emitting element such that the laser light enters the optical fiber. The casing includes a through hole from a first end face to a second end face. The through hole includes a diameter which decreases in a stepwise manner from the first end face toward the second end face. The ferrule is fitted to a small bore portion of the through hole, which is smallest in diameter. The light-emitting element is fitted to a large bore portion of the through hole, which is larger in diameter than the small bore portion.

22 Claims, 6 Drawing Sheets

LIGHT SOURCE DEVICE AND MANUFACTURING METHOD OF LIGHT SOURCE DEVICE

CROSS REFERENCE TO RELATED APPLICATION

This application claims the benefit of priority of Japanese Patent Application Number 2016-184847 filed on Sep. 21, 2016, the entire content of which is hereby incorporated by reference.

BACKGROUND

1. Technical Field

The present disclosure relates to a light source device which uses laser light as a light source.

2. Description of the Related Art

Conventionally, light-emitting elements including a laser chip mounted inside a package or the like formed of metal is known (see, for example, Japanese Unexamined Patent Application Publication No. 2013-149449). The light-emitting element described in Japanese Unexamined Patent Application Publication No. 2013-149449 includes a laser chip mounted in a package which is air-tightly sealed. Laser light emitted by the laser chip is directly guided to the outside of the package by an optical rod penetrating from inside of the package to the outside. The light output from the optical rod is condensed by an optical lens, and emitted to an irradiation target.

In addition, in recent years, a light transmission method using an optical fiber is more and more generalized. Accordingly, there is a demand for a technique for guiding laser light emitted by a laser chip in a package, to an optical fiber.

SUMMARY

With the above-described conventional light-emitting element, laser light is directly guided from inside a package that is air-tightly sealed to an optical rod to be condensed by an optical lens. Accordingly, a laser chip, an optical rod, and an optical lens need to be precisely aligned. In addition, in order to precisely align the laser chip, the optical rod, and the optical lens, a precise and complicated device structure is required. Accordingly, it has been difficult to guide laser light condensed by an optical lens into a thin and soft optical fiber.

In view of the above, an object of the present disclosure is to provide a light source device capable of accurately aligning an optical fiber and a light-emitting element with a simple configuration.

A light source device according to an aspect of the present disclosure includes: a ferrule which holds an optical fiber; a light-emitting element which emits laser light; and a casing which houses the ferrule and the light-emitting element such that the laser light emitted by the light-emitting element enters the optical fiber held by the ferrule. The casing includes a through hole from a first end face to a second end face of the casing. The through hole includes a diameter which decreases in a stepwise manner from the first end face toward the second end face of the casing. The ferrule is fitted to a first portion of the through hole. The first portion has a smallest diameter among diameters of the through hole. The light-emitting element is fitted to a second portion of the through hole. The second portion has a diameter larger than the first portion among the diameters of the through hole.

According to the present disclosure, it is possible to accurately align an optical fiber and a light-emitting element with a simple configuration.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

The following describes a lighting apparatus according to an embodiment of the present disclosure. It should be noted that the subsequently-described embodiment shows a specific preferred example of the present disclosure. The numerical values, shapes, materials, structural components, the disposition and connection of the structural components, etc. described in the following embodiment are mere examples, and do not intend to limit the present disclosure. Furthermore, among the structural components in the following exemplary embodiment, components not recited in the independent claim which indicates the broadest concept of the present disclosure are described as arbitrary structural components.

In addition, each diagram is a schematic diagram and not necessarily strictly illustrated. Furthermore, in the respective figures, the same numerical sign is given to identical structural components.

(Embodiment)

The following describes light source device 1 according to an embodiment of the present disclosure, with reference to the drawings.

Figure 1:
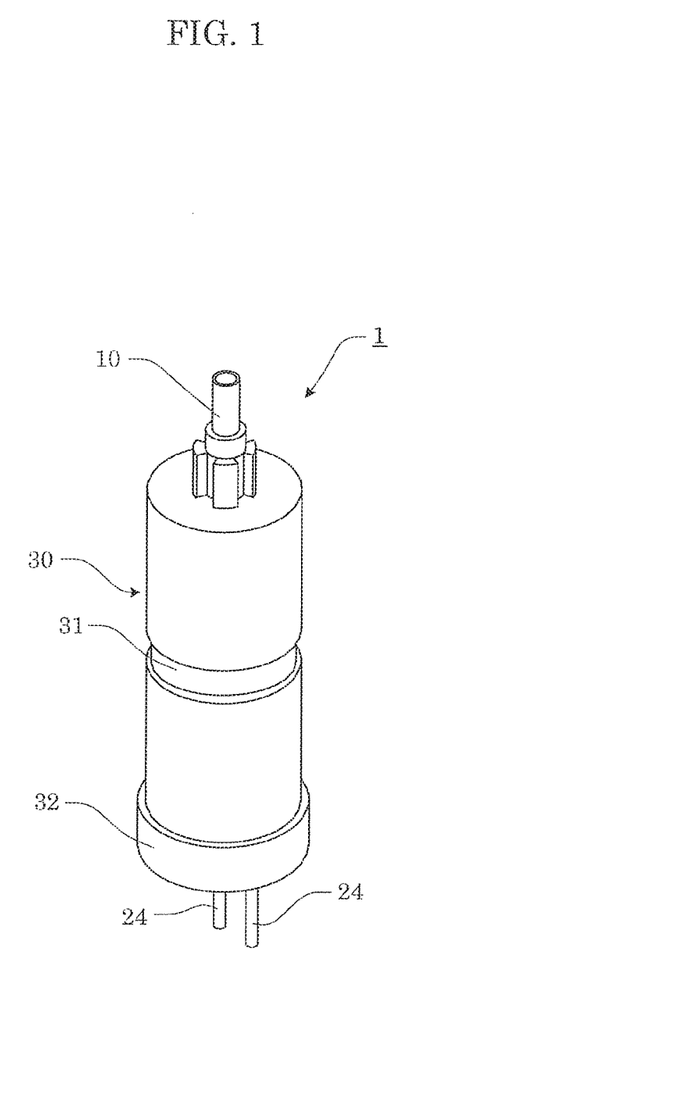
FIG. 1 shows a perspective external view illustrating a configuration of the light source device according to an embodiment.
Figure 2:
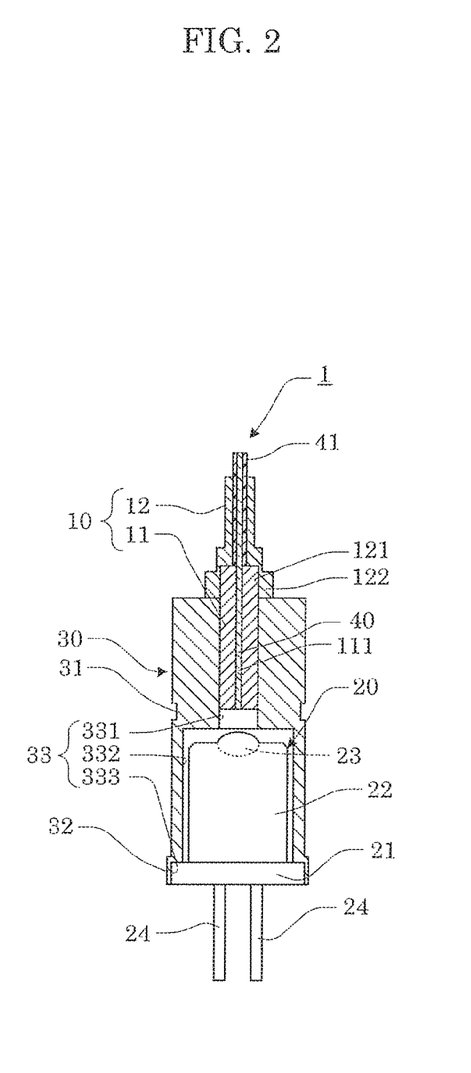
FIG. 2 is a cross-sectional diagram which illustrates the light source device of FIG. 1.
Figure 3:
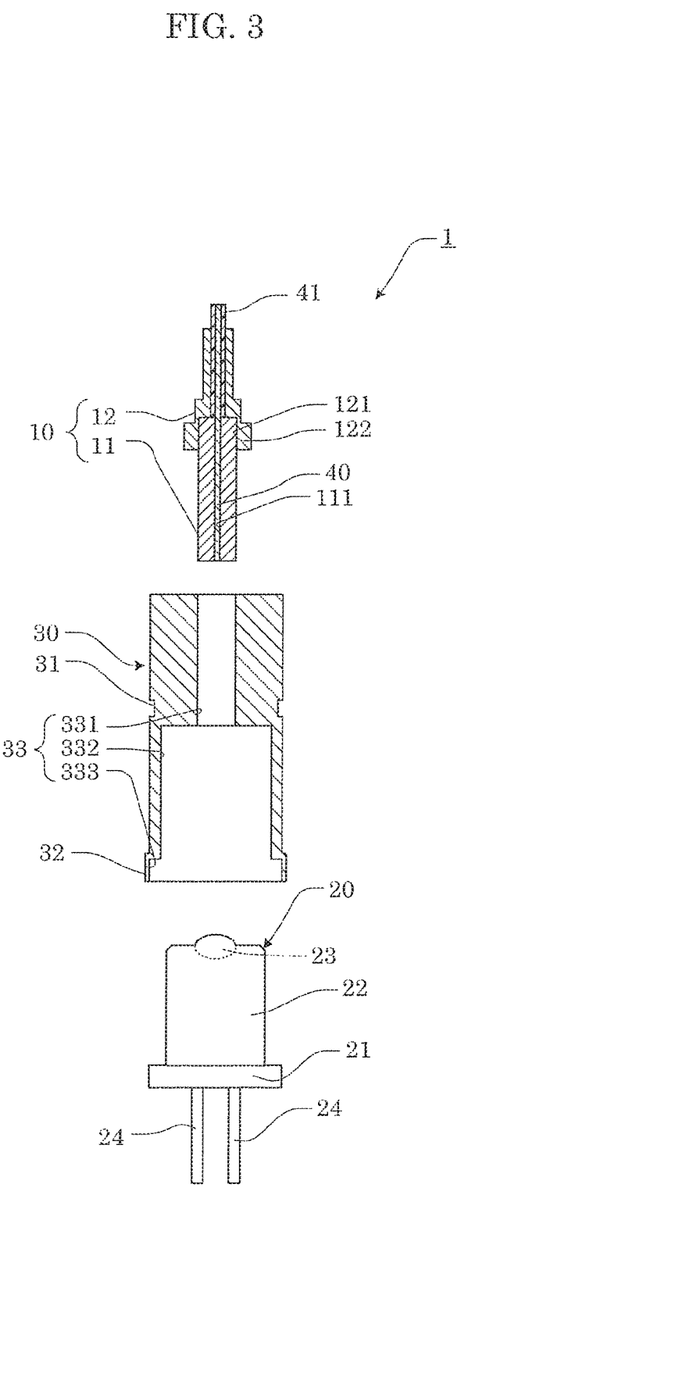
FIG. 3 is an exploded cross-sectional diagram which illustrates the light source device of FIG. 2 in a disassembled manner.

First, a configuration of light source device 1 will be described. FIG. 1 is a perspective external view which illustrates a configuration of the lighting apparatus according to an embodiment. FIG. 2 is a cross-sectional diagram which illustrates the light source device of FIG. 1. FIG. 3 is an exploded cross-sectional diagram which illustrates the light source device of FIG. 2 in a disassembled manner. It should be noted that light-emitting element 20 is illustrated in a front view in FIG. 2 and FIG. 3.

As illustrated in FIG. 1 to FIG. 3, light source device 1 includes flanged ferrule 10, light-emitting element 20, and casing 30.

Flanged ferrule 10 is a component which holds optical fiber 40, and includes ferrule 11 and flange 12 into which ferrule 11 is pressed. An outer peripheral surface of optical fiber 40 other than a portion held by ferrule 11 is covered by coating 41 for protection.

Ferrule 11 is an elongated cylindrical component and includes through hole 111 defined at the center of an end face along an axis direction. Optical fiber 40 is inserted in through hole 111, and bonded by an adhesive in through hole 111 of ferrule 11 so as to be positioned. Ferrule 11 is formed using, for example, a ceramic sintered compact such as zirconia, or metal such as stainless steel.

Flange 12 is a component formed using, for example, metal or resin, and is attached to one end of ferrule 11. Flange 12 is formed into a shape which is tapered in a stepwise manner, and includes through hole 121 defined at the center of a tip face along an axis direction. Through hole 121 is formed into a two-step shape which is thin at a tip side and wide at a base side. Optical fiber 40 covered by coating 41 is inserted into the tip side of through hole 121, and is bonded by an adhesive. The tip of ferrule 11 in which optical fiber 40 is incorporated is pressed into the base side of through hole 121. In this manner, flange 12 is integrated with ferrule 11. The base of flange 12 has an outer diameter larger than an outer diameter of ferrule 11. More specifically, the base of flange 12 includes brim 122 discontinuously formed in a circumferential direction, and brim 122 defines an outer diameter larger than the outer diameter of ferrule 11.

Light-emitting element 20 is a light-emitting device which emits laser light. More specifically, light-emitting element 20 integrally includes: a light emitter (illustration omitted); board 21 which supports the light emitter; cap 22 which covers the light emitter; and lens 23 which is held by cap 22.

The light emitter is a semiconductor laser diode which emits short-wavelength light having a wavelength less than or equal to 500 nm, for example.

Board 21 is a disk-shaped board formed using metal such as an Fe-based alloy (stainless steel, steel forged, etc.), an Ni-based alloy (kovar, etc.), a Cu-based alloy (brass, etc.), etc. Board 21 is provided with lead terminal 24. Lead terminal 24 is a terminal for, for example, supplying power to the light emitter from outside of light source device 1.

Cap 22 is a metal cap joined to board 21 so as to cover the light emitter mounted on board 21. Cap 22 is joined to board 21 by, for example, resistance welding (projection welding). Cap 22 is configured using, for example, metal such as an Fe-based alloy (stainless steel, steel forged, etc.), an Ni-based alloy (kovar, etc.), etc. Furthermore, cap 22 has an opening on a surface opposite to board 21 when joined to board 21, and lens 23 is held in the opening.

Lens 23 is a condenser lens for condensing laser light emitted from the light emitter, into optical fiber 40 held by ferrule 11. Lens 23 held by cap 22 is disposed such that a focal point of lens 23 is coaxial with the optical axis of the light emitter.

Casing 30 is a housing formed using metal such as an Fe-based alloy (stainless steel, steel forged, etc.), a Cu-based alloy (brass, etc.), etc. Casing 30 is formed into a substantially cylindrical shape, and houses a portion of flanged ferrule 10 and light-emitting element 20 inside casing 30. Groove 31 is defined on an outer periphery of a center portion of casing 30 to extend over the whole circumference. In addition, protrusion 32 which protrudes from a base of casing 30 over the whole circumference is defined on an outer periphery of a base of casing 30. Casing 30 includes a first end face and a second end face. Casing 30 includes through hole 33 defined at the center of a tip face (the second end face) along an axis direction. In this manner, through hole 33 penetrates from a base face (the first end face) to the tip face of casing 30. Through hole 33 is defined to have a diameter which decreases in a stepwise manner (monotonic decrease) from the base face toward the tip face of casing 30. More specifically, through hole 33 includes small bore portion 331, middle bore portion 332, and large bore portion 333 in order from the tip side. Small bore portion 331, middle bore portion 332, and large bore portion 333 are each a cylindrical opening, and coaxially disposed.

Ferrule 11 of flanged ferrule 10 is fitted to small bore portion 331 that is a first portion. For that reason, small bore portion 331 has a diameter slightly larger than the outer diameter of ferrule 11 so that ferrule 11 is fitted to small bore portion 331. By ferrule 11 being fitted to small bore portion 331, optical fiber 40 held by ferrule 11 is positioned on the center axis of small bore portion 331. In addition, by inserting and pressing ferrule 11 into small bore portion 331, the base of flange 12 is in contact with the tip face of casing 30. In this manner, further ingress of ferrule 11 is restricted, and thus it is possible to position optical fiber 40 in the axis direction. Ferrule 11 is attachable to and detachable from small bore portion 331. With this configuration, it is possible to detach ferrule 11 from casing 30 to easily perform maintenance. It should be noted that ferrule 11 may be fixed to small bore portion 331.

Light-emitting element 20 is housed in middle bore portion 332 and large bore portion 333. Large bore portion 333 is a second portion, and middle bore portion 332 is a third portion. More specifically, cap 22 of light-emitting element 20 is housed in middle bore portion 332, and board 21 of light-emitting element 20 is housed in large bore portion 333. Middle bore portion 332 has a diameter larger than an outer diameter of cap 22, such that an inner circumference surface defining middle bore portion 332 is not in contact with cap 22. In addition, when board 21 is welded by YAG laser welding in large bore portion 333, large bore portion 333 has a diameter slightly larger than an outer diameter of board 21. When board 21 is pressed into large bore portion 333, large bore portion 333 has a diameter slightly larger than an outer diameter of board 21. Either way, by board 21 being fitted to large bore portion 333, light-emitting element 20 is positioned on the center axis of large bore portion 333. In other words, optical fiber 40 positioned by small bore portion 331 and light-emitting element 20 positioned by large bore portion 333 are coaxially disposed. More specifically, the center axis of optical fiber 40 and the focal point of lens 23 held by cap 22 are coaxially disposed.

When board 21 of light-emitting element 20 is inserted and pressed into large bore portion 333, the main surface of board 21 is in contact with an inner top face which defines large bore portion 333. In this manner, further ingress of light-emitting element 20 is restricted, and thus it is possible to position light-emitting element 20 in the axis direction. Light-emitting element 20 may be attachable to and detachable from large bore portion 333. With this configuration, it is possible to detach light-emitting element 20 from casing 30 to easily perform maintenance. Light-emitting element 20 may be fixed to large bore portion 333.

Next, a manufacturing method of light source device 1 will be described.

Light-emitting element 20 is attached to casing 30 in the state illustrated in FIG. 3. More specifically, luminescence element 20 is inserted to through hole 33 of casing 30 from the base face of casing 30. In this manner, board 21 of light-emitting element 20 is fitted to large bore portion 333 of through hole 33, and light-emitting element 20 is positioned in the direction orthogonal to the axis direction. In addition, by the main surface of board 21 being in contact with the inner top face of large bore portion 333, light-emitting element 20 is positioned in the axis direction.

Next, flanged ferrule 10 is attached to casing 30. More specifically, ferrule 11 of flanged ferrule 10 is inserted to through hole 33 of casing 30 from the tip face of casing 30. In this manner, ferrule 11 is fitted to small bore portion 331 of through hole 33, and ferrule 11 is positioned in the direction orthogonal to the axis direction. In addition, by the base of flange 12 of flanged ferrule 10 being in contact with the tip face of casing 30, ferrule 10 is positioned in the axis direction. In this manner, optical fiber 40 is positioned. FIG. 1 and FIG. 2 each shows light source device 1 after assembling.

As described above, light source 1 according to the present embodiment includes: ferrule 11 which holds optical fiber 40; light-emitting element 20 which emits laser light; and casing 30 which houses ferrule 11 and light-emitting element 20 in such a manner that the laser light emitted by light-emitting element 20 enters optical fiber 40 held by ferrule 11. Casing 30 includes through hole 33 from a base face (first end face) to a tip face (second end face) of casing 30. Through hole 33 includes a diameter which decreases in a stepwise manner from the base face toward the tip face of casing 30. Ferrule 11 is fitted to small bore portion 331 of through hole 33. Small bore portion 331 has a smallest diameter among diameters of through hole 33. Light-emitting element 20 is fitted to large bore portion 333 of through hole 33. Large bore portion 333 has a diameter larger than small bore portion 331 among the diameters of through hole 33.

According to this configuration, ferrule 11 is fitted to small bore portion 331 of through hole 33, and light-emitting element 20 is fitted to large bore portion 333 of through hole 33. Accordingly, it is possible to position ferrule 11 and light-emitting element 20 in the direction orthogonal to the axis direction, by simply fitting ferrule 11 and light-emitting element 20 to through hole 33. In this manner, it is possible to accurately position optical fiber 40 held by ferrule 11 and light-emitting element 20 with a simple configuration.

When, for example, casing 30 is manufactured by cutting work such as turning, the case is assumed where large bore portion 333 is formed by sliding a tool from the base face of a workpiece that is to be casing 30, and small bore portion 331 is formed by sliding the tool from the tip face of the workpiece after the workpiece is turned around.

In this case, small bore portion 331 and large bore portion 333 might be misaligned by turning around the workpiece. However, when through hole 33 is defined to have a diameter which decreases in a stepwise manner from the base face toward the tip face of casing 30 according to the present embodiment, it is possible to form large bore portion 333, middle bore portion 332, and small bore portion 331 in order from the base face of a workpiece, by simply sliding a tool toward the workpiece in a single direction. Accordingly, accuracy of through hole of 33 casing 30 can be increased, and furthermore it is possible to increase the accuracy of positioning of optical fiber 40 and light-emitting element 20.

In addition, light source 1 according to the present embodiment further includes flange 12 attached to ferrule 11. Flange 12 has an outer diameter larger than an outer diameter of ferrule 11. Flange 12 is in contact with the tip face of casing 30.

According to this configuration, since flange 12 is in contact with the tip face of casing 30, further ingress of ferrule 11 is restricted, and thus it is possible to position optical fiber 40 in the axis direction.

In addition, since ferrule 11 is attachable to and detachable from small bore portion 331, it is possible to detach ferrule 11 from casing 30 to easily perform maintenance.

(Modification 1)

In the foregoing embodiment, the case where lens 23 is formed integrally with light-emitting element 20 is exemplified. In Modification 1, however, the case where a light-emitting element and a lens are formed as separate bodies will be exemplified. In the following description, the same structural components as the foregoing embodiment are assigned with the same reference signs, and there are instances where the description will be omitted.

Figure 4:
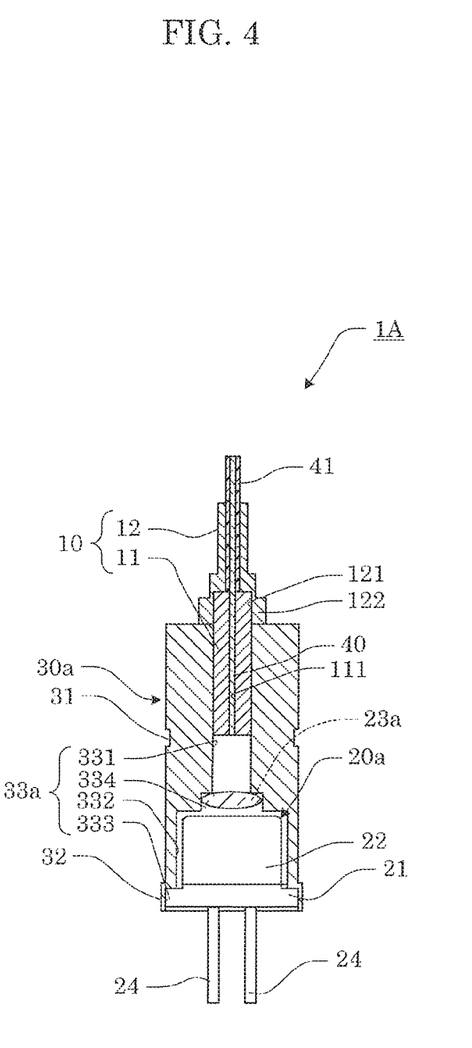
FIG. 4 is a cross-sectional diagram which illustrates the light source device according to Modification 1.

FIG. 4 is a cross-sectional diagram which illustrates the light source device according to Modification 1, and corresponds to FIG. 2. As illustrated in FIG. 4, light-emitting element 20a and lens 23a included in light source device LA are formed as separate bodies. Lens 23a is disposed on the optical axis of a light emitter of light-emitting element 20a.

In through hole 33a of casing 30a, intermediate portion 334 is defined between small bore portion 331 and middle bore portion 332. Intermediate portion 334 is a cylindrical opening, and disposed coaxially with small bore portion 331, middle bore portion 332, and large bore portion 333. Intermediate portion 334 has a diameter larger than a diameter of small bore portion 331 and smaller than a diameter of middle bore portion 332. In other words, intermediate portion 334 is disposed between small bore portion 331 and large bore portion 333, and has the diameter smaller than the diameter of large bore portion 333. More specifically, the diameter of intermediate portion 334 is slightly larger than an outer diameter of lens 23a such that lens 23a is fitter to the diameter of intermediate portion 334. By lens 23a being fitted to intermediate portion 334, lens 23a is positioned on the center axis of intermediate portion 334.

As described above, optical fiber 40 is positioned at small bore portion 331 via ferrule 11, and light-emitting element 20a is positioned at large bore portion 333. Accordingly, lens 23a positioned at intermediate portion 334 is also disposed coaxially with optical fiber 40 and light-emitting element 20a.

Thus, even when lens 23a is formed separately from light-emitting element 20a, it is possible to accurately position lens 23a, optical fiber 40, and light-emitting element 20a with a simple configuration.

(Modification 2)

In the foregoing embodiment, casing 30 having a substantially cylindrical shape is exemplified. However, the casing may be formed to have any external shape. In Modification 2, an example of another external shape of the casing will be described.

Figure 5:
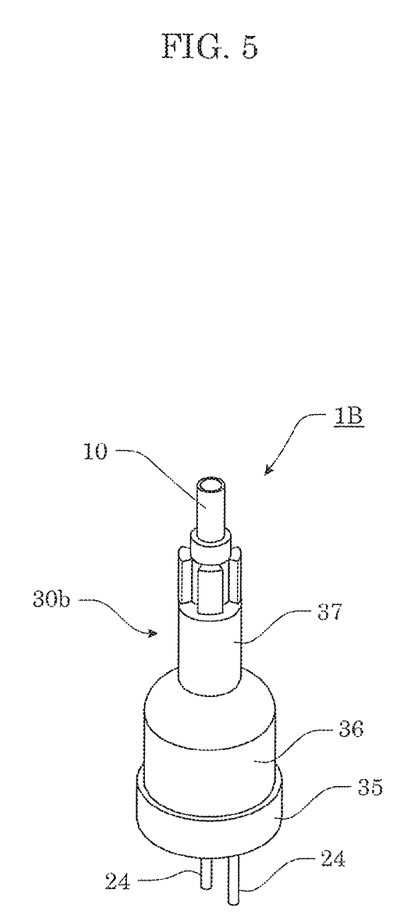
FIG. 5 shows a perspective external view illustrating a configuration of the light source device according to Modification 2.
Figure 6:
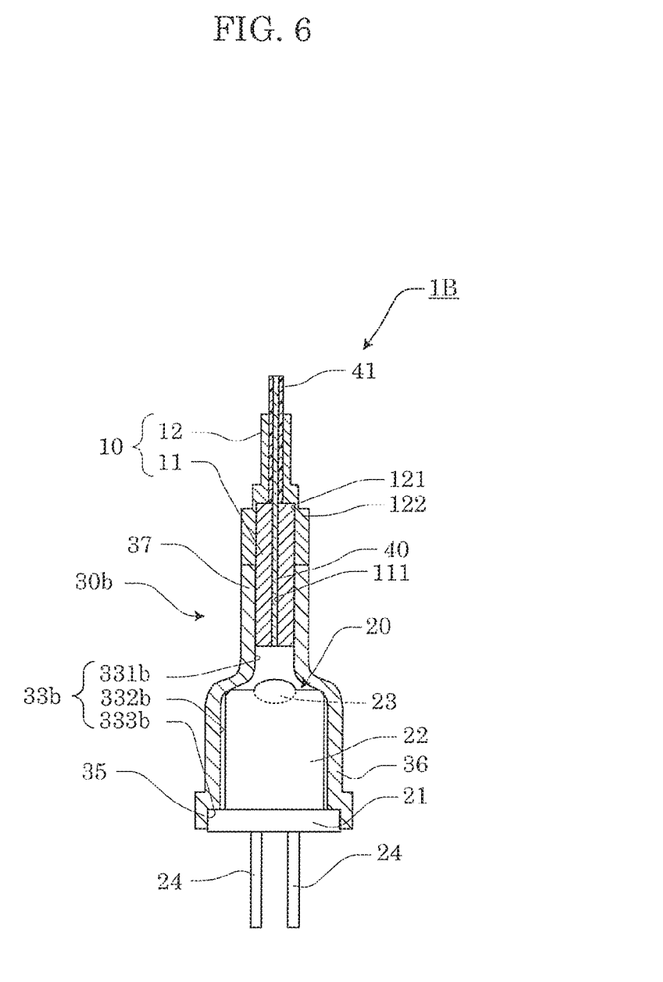
FIG. 6 is a cross-sectional diagram which illustrates the light source device of FIG. 5.

FIG. 5 shows a perspective external view illustrating a configuration of the light source device according to Modification 2. FIG. 6 is a cross-sectional diagram which illustrates the light source device of FIG. 5.

As illustrated in FIG. 5 and FIG. 6, casing 30b of light source device 1B according to Modification 2 has an external shape which is tapered in a stepwise manner from the base toward the tip. More specifically, casing 30b includes brim 35, main body 36, and receiver 37 in order from the base, and brim 35, main body 36, and receiver 37 are coaxially disposed. Brim 35 is a portion which protrudes from main body 36 over the whole circumference. Large pore portion 333b of through hole 33b corresponds to brim 35. When board 21 of light-emitting element 20 is fitted to large bore portion 333b, board 21 is disposed at a position corresponding to brim 35.

Main body 36 is a portion having a cylindrical shape. Middle bore portion 332*b* of through hole 33*b* corresponds to main body 36. When board 21 of light-emitting element 20 is fitted to large bore portion 333*b*, cap 22 of light-emitting element 20 is disposed at a position corresponding to main body 36.

Receiver 37 is a portion having a cylindrical shape and receives flanged ferrule 10. Small bore portion 331*b* of through hole 33*b* corresponds to receiver 37. When ferrule 11 of flanged ferrule 10 is fitted to small bore portion 331*b*, ferrule 11 is disposed at a position corresponding to receiver 37. The base of flange 12 is in contact with a tip face of receiver 37. In this manner, further ingress of ferrule 11 is restricted, and thus it is possible to position optical fiber 40 in the axis direction.

A boundary area between receiver 37 and main body 36 has a curved shape in which an outer diameter decreases toward the tip. In the same manner as above, a boundary area between middle bore portion 332*b* and small bore portion 331*b* has a curved shape in which a diameter decreases toward the tip. With such shapes, it is possible to easily form casing 30*b* even by press working. It should be noted that it is also possible to form casing 30*b* by cutting work.

In addition, the outer diameter of the flange may decrease in a stepwise manner along a direction from the first end face toward the second end face of the casing.

The ferrule may be an elongated cylinder having a through hole extending in an axis direction from a center of an end face.

The light source device may further include: a lens in the casing that condenses the laser light emitted from the light-emitting element, into the optical fiber held by the ferrule. The lens may be in the second portion of the through hole.

In addition, a focal point of the lens may be coaxial with an optical axis of the light-emitting element.

The first portion and the second portion of the through hole may be each cylindrical and coaxial.

The through hole may include a third portion between the first portion and the second portion, the third portion including a diameter larger than the smallest diameter of the first portion and smaller than the diameter of the second portion, the third portion being cylindrical and coaxial with the first portion and the second portion.

The optical fiber may be positioned on a central axis of the first portion.

The light-emitting element may be a semiconductor laser diode that emits the laser light having a wavelength at most equal to 500 nm.

The casing may be cylindrical and includes a groove extending over a whole circumference of an outer surface of a center portion of the casing.

The casing may be cylindrical and include a protrusion which protrudes over a whole circumference of an outer surface of a base of the casing.

The through hole may include a third portion adjacent the second portion opposite the first portion, the third portion having a diameter larger than the diameter of the second portion among the diameters of the through hole. The light-emitting element may include a cap and a board, the board having a diameter larger than a diameter of the cap. The cap may be housed in the second portion of the through hole, and the board may be housed in the third portion of the through hole.

The board may be in contact with an inner top face of the casing which defines the third portion of the through hole.

The optical fiber may be positioned by the first portion and the light-emitting element may be positioned by the third portion, with the optical fiber and the light-emitting element being coaxially disposed.

In addition, an outer surface of the casing may include a curved surface portion that corresponds to a transition from the second portion to the first portion of the through hole and that decreases in diameter in a direction toward the second end face of the casing.

In addition, a manufacturing method of a light source device according to the present disclosure includes: inserting a light-emitting element into a second portion of a through hole of a casing; and fitting a ferrule into a first portion of the through hole of the casing. In the manufacturing method of the light source device, the ferrule holds an optical fiber, the light-emitting element emits laser light, the casing houses the ferrule and the light-emitting element such that the laser light emitted by the light-emitting element enters the optical fiber held by the ferrule, the casing includes the through hole from a first end face to a second end face of the casing, the through hole includes a diameter which decreases in a stepwise manner from the first end face toward the second end face of the casing, the first portion of the through hole into which the ferrule is fitted has a smallest diameter among diameters of the through hole, and the second portion of the through hole into which the light-emitting element is inserted has a diameter larger than the first portion among the diameters of the through hole.

The manufacturing method according to the present disclosure may further include: forming the through hole in the casing by sliding a tool toward the casing in a single direction from the first end face toward the second end face to form the second portion and the first portion in order.

(Others)

The light source device according to the present disclosure has been described based on the embodiment and modifications as above; however, the present disclosure is not limited to the above-described embodiment and modifications.

It should be noted that the present disclosure also includes other forms in which various modifications apparent to those skilled in the art are applied to the embodiment and the modifications or forms in which structural components and functions in the embodiment and the modifications are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light source device, comprising:
a ferrule which holds an optical fiber;
a light-emitting element which emits laser light; and
a casing which houses the ferrule and the light-emitting element such that the laser light emitted by the light-emitting element enters the optical fiber held by the ferrule, wherein
the casing is a single component,
the casing includes a through hole from a first end face to a second end face of the casing, the through hole includes a diameter which decreases in a stepwise manner from the first end face toward the second end face of the casing, the ferrule is fitted to a first portion of the through hole, the first portion having a smallest diameter among diameters of the through hole, and the light-emitting element is fitted to a second portion of the through hole, the second portion having a diameter larger than the first portion among the diameters of the through hole.

2. The light source device according to claim 1, further comprising:

a flange attached to the ferrule, the flange having an outer diameter larger than an outer diameter of the ferrule and being in contact with the second end face of the casing.

3. The light source device according to claim 2, wherein the outer diameter of the flange decreases in a stepwise manner along a direction from the first end face toward the second end face of the casing.

4. The light source device according to claim 1, further comprising a lens which condenses the laser light emitted from the light-emitting element, into the optical fiber held by the ferrule, wherein the lens is fitted to an intermediate portion of the through hole, the intermediate portion being between the first portion and the second portion, the intermediate portion having a diameter larger than the smallest diameter of the first portion among the diameters of the through hole and smaller than the diameter of the second portion among the diameters of the through hole.

5. The light source device according to claim 1, wherein the ferrule is attachable to and detachable from the first portion.

6. The light source device according to claim 1, wherein the ferrule is an elongated cylinder having a through hole extending in an axis direction from a center of an end face.

7. The light source device according to claim 1, further comprising:

a lens in the casing that condenses the laser light emitted from the light-emitting element, into the optical fiber held by the ferrule, wherein the lens is in the second portion of the through hole.

8. The light source device according to claim 7, wherein a focal point of the lens is coaxial with an optical axis of the light-emitting element.

9. The light source device according to claim 1, wherein the first portion and the second portion of the through hole are each cylindrical and coaxial.

10. The light source device according to claim 9, wherein the through hole includes a third portion between the first portion and the second portion, the third portion including a diameter larger than the smallest diameter of the first portion and smaller than the diameter of the second portion, the third portion being cylindrical and coaxial with the first portion and the second portion.

11. The light source device according to claim 10, wherein the optical fiber is positioned on a central axis of the first portion.

12. The light source device according to claim 1, wherein the light-emitting element is a semiconductor laser diode that emits the laser light having a wavelength at most equal to 500 nm.

13. The light source device according to claim 1, wherein the casing is cylindrical and includes a groove extending over a whole circumference of an outer surface of a center portion of the casing.

14. The light source device according to claim 1, wherein the casing is cylindrical and includes a protrusion which protrudes over a whole circumference of an outer surface of a base of the casing.

15. The light source device according to claim 1, wherein the through hole includes a third portion adjacent the second portion opposite the first portion, the third portion having a diameter larger than the diameter of the second portion among the diameters of the through hole, the light-emitting element includes a cap and a board, the board having a diameter larger than a diameter of the cap, the cap is housed in the second portion of the through hole, and the board is housed in the third portion of the through hole.

16. The light source device according to claim 15, wherein the board is in contact with an inner top face of the casing which defines the third portion of the through hole.

17. The light source device according to claim 16, wherein the optical fiber is positioned by the first portion and the light-emitting element is positioned by the third portion, with the optical fiber and the light-emitting element being coaxially disposed.

18. The light source device according to claim 1, wherein an outer surface of the casing includes a curved surface portion that corresponds to a transition from the second portion to the first portion of the through hole and that decreases in diameter in a direction toward the second end face of the casing.

19. The light source device according to claim 1, wherein the through hole includes a third portion opposite to the first portion and adjacent to the second portion, the third portion includes a diameter larger than the diameter of the second portion, the light-emitting element includes a cap having a diameter smaller than the diameter of the second portion, and a board having a diameter larger than the diameter of the cap, the cap is housed in the second portion of the through hole, and the board is housed in the third portion of the through hole.

20. The light source device according to claim 1, wherein the diameter of the through hole included in the casing only decreases from the first end face to the second end face, and only decreases in the stepwise manner.

21. A manufacturing method of a light source device, the manufacturing method comprising:

inserting a light-emitting element into a second portion of a through hole of a casing; and fitting a ferrule into a first portion of the through hole of the casing, wherein the ferrule holds an optical fiber, the light-emitting element emits laser light, the casing houses the ferrule and the light-emitting element such that the laser light emitted by the light-emitting element enters the optical fiber held by the ferrule, the casing is a single component, the casing includes the through hole from a first end face to a second end face of the casing, the through hole includes a diameter which decreases in a stepwise manner from the first end face toward the second end face of the casing, the first portion of the through hole into which the ferrule is fitted has a smallest diameter among diameters of the through hole, and the second portion of the through hole into which the light-emitting element is inserted has a diameter larger than the first portion among the diameters of the through hole.

22. The manufacturing method according to claim 21, further comprising:

forming the through hole in the casing by sliding a tool toward the casing in a single direction from the first end face toward the second end face to form the second portion and the first portion in order.

\* \* \* \* \*